US010843583B2

(12) United States Patent
Berger et al.

(10) Patent No.: US 10,843,583 B2
(45) Date of Patent: Nov. 24, 2020

(54) METHOD FOR CARRYING OUT A CHARGING OPERATION AT A CHARGING STATION

(71) Applicant: Bayerische Motoren Werke Aktiengesellschaft, Munich (DE)

(72) Inventors: Jens Berger, Munich (DE); Enrique Marcial-Simon, Veitshoechheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/403,342

(22) Filed: May 3, 2019

(65) Prior Publication Data
US 2019/0255964 A1 Aug. 22, 2019

Related U.S. Application Data

(63) Continuation of application No. PCT/EP2017/076141, filed on Oct. 13, 2017.

(30) Foreign Application Priority Data

Nov. 4, 2016 (DE) .................. 10 2016 221 640

(51) Int. Cl.
*B60L 53/63* (2019.01)
*B60L 53/30* (2019.01)
(Continued)

(52) U.S. Cl.
CPC ............. *B60L 53/305* (2019.02); *B60L 53/65* (2019.02); *B60L 53/66* (2019.02); *B60L 53/665* (2019.02);
(Continued)

(58) Field of Classification Search
CPC ...................................................... B60L 53/305
(Continued)

(56) References Cited

U.S. PATENT DOCUMENTS 8,359,126 B2    1/2013  Tate, Jr. et al.
2013/0024306 A1  1/2013  Shah et al.
(Continued)

FOREIGN PATENT DOCUMENTS

DE    10 2010 018 577 A1    8/2011

OTHER PUBLICATIONS

PCT/EP2017/076141, International Search Report dated Jan. 24, 2018 (Three (3) pages).
(Continued)

Primary Examiner — Edward Tso
Assistant Examiner — Ahmed H Omar
(74) Attorney, Agent, or Firm — Crowell & Moring LLP

(57) ABSTRACT

A method for carrying out a charging operation for a vehicle at a charging station includes detecting a request for a charging operation on an electronic communication device and determining position data that indicates the position of the communication device. The method also includes determining whether a wireless connection exists between the communication device and the vehicle, where the wireless connection is based on a short-distance communication method with a nominal range. The method additionally includes determining a number of possible charging stations and/or a number of possible vehicles subject to the position data and nominal range.

16 Claims, 1 Drawing Sheet

(51) Int. Cl.
   *B60L 53/66*      (2019.01)
   *B60L 53/65*      (2019.01)

(52) U.S. Cl.
   CPC ............ *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
   USPC .................................................. 320/104, 109
   See application file for complete search history.

(56) References Cited

U.S. PATENT DOCUMENTS

| | | |
|---|---|---|
| 2014/0312853 A1 | 10/2014 | Dreina |
| 2015/0123619 A1 | 5/2015 | Marathe et al. |
| 2015/0224888 A1 | 8/2015 | Wild et al. |
| 2016/0121748 A1* | 5/2016 | Wytock ................... H02J 7/02 320/109 |

OTHER PUBLICATIONS

German Search Report issued in German counterpart application No. 10 2016 221 640.6 dated Sep. 19, 2017, with Statement of Relevancy (Nine (9) pages).

"Green Car Versatile Plug", ip.com Journal, ip.com Inc., West Henrietta, NY, US, Dec. 18, 2018, 4 total pages, XP013128566.

* cited by examiner

METHOD FOR CARRYING OUT A CHARGING OPERATION AT A CHARGING STATION

CROSS REFERENCE TO RELATED APPLICATIONS

This application is a continuation of PCT International Application No. PCT/EP2017/076141, filed Oct. 13, 2017, which claims priority under 35 U.S.C. § 119 from German Patent Application No. 10 2016 221 640.6, filed Nov. 4, 2016, the entire disclosures of which are herein expressly incorporated by reference.

BACKGROUND AND SUMMARY OF THE INVENTION

The invention relates to a method and a corresponding system that allow explicit associations between electrical charging stations and a vehicle with an electric drive to be determined in order to perform a charging process for the vehicle.

Vehicles with an electric drive (in particular electric vehicles or plug in hybrid vehicles) comprise electrical energy stores (e.g., batteries) that can be connected to a charging station by means of a charging apparatus of the vehicle and charged. To charge the electrical stores of such electric and/or hybrid vehicles, various conductive, i.e., wired, charging technologies exist. For what is known as AC charging, the charger converting the direct current (also referred to as DC current) for charging the electrical store is in the vehicle. A charging cable between the charging station and the vehicle is used to transfer an AC (alternating current) current. For what is known as DC charging, the charger converting the direct current for charging the electrical store is in the charging station. The charging cable is therefore used to transfer a DC (direct current) current. DC charging is frequently also referred to as fast charging, since the charging power for DC charging is in most cases above the charging power of AC charging.

Typically, electric vehicles today use a unidirectional basic communication compliant with the IEC 61851-1 standard in mode 3 for a charging process with a charging station. This basic communication comprises a pilot signal with a PWM signal for maximum charging current stipulation by the charging station. If the performance of a vehicle charging process requires an authorization and/or an identification by the vehicle or the driver of the vehicle (for example when charging at a public charging station), this can be achieved by means of a manual method such as, for example, RFID scanning or the like. This is inconvenient for a user, however. Additionally, such a method cannot be used to ensure that the vehicle identified by means of an RFID is actually charged at a charging station.

The present document is concerned with the technical object of ascertaining as explicit an association as possible between a charging station and a vehicle being charged or intended to be charged at the charging station in an efficient manner even with limited direct communication options (such as in particular in the case of IEC 61851-1).

According to one aspect, a method for performing a charging process for a vehicle at a charging station is described. The method comprises detecting a request for a charging process on an electronic communication device (in particular on a smartphone). The electronic communication device can be a mobile device typically carried by a user. The request for a charging process can be made by the communication device, for example, by means of an SW application (what is known as an app). For this purpose, the communication device can use a (typically cellular) communication network (e.g., UMTS, LTE, etc.) to send a message to a (central) server managing a multiplicity of charging stations. Alternatively or additionally, it is possible to detect directly in the communication device (e.g., by means of the app) that a request for a charging process is made.

The method further comprises ascertaining position data indicating a position of the communication device. Typically, communication devices comprise a GPS receiver configured to ascertain position data (e.g., GPS coordinates) indicating the position of the communication device.

Additionally, the method comprises ascertaining whether there is a radio connection between the communication device and the vehicle, wherein the radio connection is based on a short-range communication method with a nominal range. The short-range communication method can in particular comprise or be Bluetooth. The nominal range of Bluetooth is approximately 10 meters. In general, for example, a short-range communication method that allows a nominal range of 100 meters or less can be used. As such, the radius of possible charging stations can be substantially limited.

In addition, the method comprises restricting or ascertaining a set of possible charging stations and/or a set of possible vehicles on the basis of the position data and the nominal range. In particular, the set of possible charging stations can be restricted or reduced to one or more charging stations and the set of possible vehicles can be restricted or reduced to one or more vehicles that are within a radius of the position of the communication device that corresponds to the nominal range.

By taking into consideration a local radio connection between a requesting communication device and a vehicle to be charged, the set of possible charging stations and/or the set of possible vehicles can be substantially narrowed down. It is therefore possible for a controlled charging process to be performed in a reliable manner (even with limited communication capabilities between vehicle and charging station). In addition, the abuse of charging stations can be reduced.

The method can comprise preventing a charging process if it is ascertained that there is no radio connection between the communication device and the vehicle. By way of example, the radio connection can be used to transmit a vehicle identifier (e.g., a vehicle identification number, VIN) to the communication device and from there to a server for charging stations. It is then possible to check whether the vehicle can be charged at a charging station. As such, improper charging processes can be reliably prevented.

The method can comprise ascertaining a vehicle identifier of the vehicle (e.g., a VIN). In addition, the method can comprise ascertaining a communication identifier (e.g., an MAC address) of a communication unit (e.g., a Bluetooth transponder) of the vehicle for the radio connection. It is then possible for a charging process to be permitted or prevented on the basis of the vehicle identifier and the communication identifier (in particular on the basis of a comparison of the two identifiers). As such, improper charging processes can be reliably prevented.

Even after narrowing down the set of possible charging stations and/or the set of possible vehicles on the basis of the nominal range of a radio connection between communication device and vehicle, the sets can further comprise multiple possible charging stations and multiple possible vehicles. The method can further comprise ascertaining a charging pair with a respective charging partner from two different sets of possible charging partners. In this case, the charging pair comprises (precisely) one charging station and (precisely) one vehicle performing a charging process at the charging station. The two different sets comprise the set of possible charging stations and the (separate) set of possible vehicles. The method can therefore ascertain which charging partner from one set of possible charging partners (e.g., from the set of vehicles) is charged at which charging partner from the other set of possible charging partners (e.g., from the set of charging stations).

The ascertaining of a charging pair can comprise prompting a stimulus for the charging process by a stimulating charging partner from a first set of the two sets of possible charging partners. By way of example, a charging station can be prompted to generate a charging-process-related stimulus for a vehicle, or vice versa.

The ascertaining of a charging pair can further comprise detecting a reaction to the stimulus by a reacting charging partner from a second set of the two sets of possible charging partners. By way of example, the (charging-process-related) reaction of a vehicle to the (charging-process-related) stimulus of a charging station can be detected (or vice versa).

It is then possible for a charging pair comprising the stimulating charging partner and the reacting charging partner to be formed. In other words, it is possible to ascertain which charging partner (e.g., which charging station) from one of the sets of possible charging partners and which charging partner (e.g., which vehicle) from the other set of possible charging partners are connected to one another for a charging process. This can be ascertained in an efficient and explicit way by observing which charging partner reacts to the stimulus of another charging partner. The stimuli and the detecting of expected reactions to the stimuli allow charging partners to be associated even if the communication connection between the charging partners does not allow identifiers of the charging partners to be exchanged (as is the case, for example, with the IEC 61851-1 standard).

The charging pair can be interconnected by means of a charging-station/vehicle communication connection. The charging-station/vehicle communication connection can be provided by means of a charging cable between the charging partners of the charging pair. The stimulus can then be transmitted from the stimulating charging partner to the reacting charging partner by means of the charging-station/vehicle communication connection.

As already set out above, the charging-station/vehicle communication connection between two charging partners of a charging pair for example can not allow an identifier of one of the charging partners to be transmitted to the other charging partner of the charging pair (and thus a direct association to be provided). The charging-station/vehicle communication connection can in particular allow a communication between the two charging partners according to the IEC 61851-1 standard, in which no exchange of identifiers is possible.

On the other hand, the charging-station/vehicle communication connection can allow a charging station of the charging pair to transmit to a vehicle of the charging pair information regarding a maximum charging power that can be provided by the charging station. This can be transmitted in particular by means of a PWM signal on a pilot line of a charging cable. In the opposite direction, the charging-station/vehicle communication connection can allow the vehicle of the charging pair to transmit to the charging station information about whether or not charging power can be drawn. This can be transmitted, for example, by means of a voltage level on the pilot line of the charging cable.

By way of example, the stimulating charging partner can be a charging station and the reacting charging partner can be a vehicle. The stimulus can comprise a change in the maximum charging power provided by the charging station for the charging process. The reaction can then comprise a change in the charging time ascertained by the vehicle for the charging process. The vehicle can then be ascertained as a charging partner for the stimulating charging station in an explicit manner.

Alternatively or additionally, the stimulating charging partner can be the vehicle and the reacting charging partner can be a charging station. The stimulus can comprise a change in the charging power drawn by the vehicle for the charging process. The reaction can then comprise a change in an operating status of the charging station to the charging process. In particular, it is possible to ascertain that a particular charging station has a changed operating status that matches the change in the charging power drawn by the vehicle for the charging process. This charging station can then be assigned the stimulating vehicle as a charging partner in an explicit manner.

The detecting of a reaction to a stimulus can comprise ascertaining a period since the stimulus was prompted. It is then possible for a reaction to the stimulus to be detected after a period shorter than or the same as a predefined maximum period. In particular, a reaction occurring after the predefined maximum period can be ignored for the determination of a charging pair. As such, the reliability of associations can be increased.

The method can further comprise ascertaining a set of possible charging stations and/or ascertaining a set of possible vehicles on the basis of one or more narrowing-down conditions. In this case, the narrowing-down conditions can relate, for example, to a position of the charging partners; to a plug-in time for initiating a charging process; to a connector type for the charging process; to a charging method for the charging process; and/or to a charging power for the charging process. By taking into consideration one or more narrowing-down conditions, it is possible for the set of possible charging stations to be reduced further. This allows the association method to be speeded up.

The method can comprise sending a message to the stimulating charging partner in order to prompt the stimulating charging partner to generate the stimulus. In particular, a system for managing charging pairs can send such a message to a stimulating charging partner. Alternatively or additionally, the method can comprise receiving a message from the reacting charging partner, with the message indicating the reaction of the reacting charging partner. In particular, the message can be received by the system for managing charging pairs. As such the system can be rendered able to ascertain charging pairs in an efficient manner.

The method can further comprise using the charging pair in a pool to take control power from an electrical supply network. Alternatively or additionally, the method can comprise checking and authorization of the charging pair to perform a charging process (e.g., in order to detect or prevent abuse).

The method can further comprise ascertaining a user identifier for a person requesting the charging process at the charging station of the ascertained charging pair. In particular, a charging process can be initiated by using the communication device (e.g., a smartphone) in order to identify oneself at the charging station. The communication device can display a user identifier.

The method can further comprise ascertaining an authorized vehicle identifier (e.g., a VIN) of a vehicle associated with the user identifier. By way of example, the user identifier can indicate one or more vehicle identifiers of vehicles that can be loaded by means of an app on the communication device.

It is possible to determine that there is abuse if an actual vehicle identifier of the vehicle of the ascertained charging pair differs from the authorized vehicle identifier (e.g., the actual vehicle identifier does not appear on the list of authorized vehicle identifiers). It is then possible to initiate a countermeasure for the abuse. By way of example, a message (e.g., an email or other electronic message) can be sent to an address associated with the user identifier. Alternatively or additionally, the user can be asked to permit or prohibit the charging process. Furthermore, it may be possible for further measures to be initiated, such as, for example, the inclusion of the actual vehicle identifier on the list of authorized vehicle identifiers, the writing of a police report (including location of the charging station of the charging pair), etc.

The method can further comprise ascertaining a user associated with the vehicle of the ascertained charging pair (e.g., such an association can be stored for the vehicle). Information regarding the charging process can then be sent to the ascertained user. For example, the user can be informed about the beginning of the charging process. As such, the convenience of a charging process for the user can be increased.

The stimulus can be stipulated by means of a unit networked to the communication device (e.g., by a server managing a multiplicity of charging stations). In this case, the stimulus can be stipulated by means of a particular incentivization (e.g., relative prices, charging powers or available amounts of energy).

According to a further aspect, a system (e.g., a server) configured to carry out the method described in this document is described.

According to a further aspect, a software (SW) program is described. The SW program can be configured to be executed on a processor and to thereby carry out the method described in this document.

According to a further aspect, a storage medium is described. The storage medium can comprise an SW program configured to be executed on a processor and to thereby carry out the method described in this document.

It should be borne in mind that the methods, apparatuses and systems described in this document can be used either on their own or in combination with other methods, apparatuses and systems described in this document. Furthermore, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
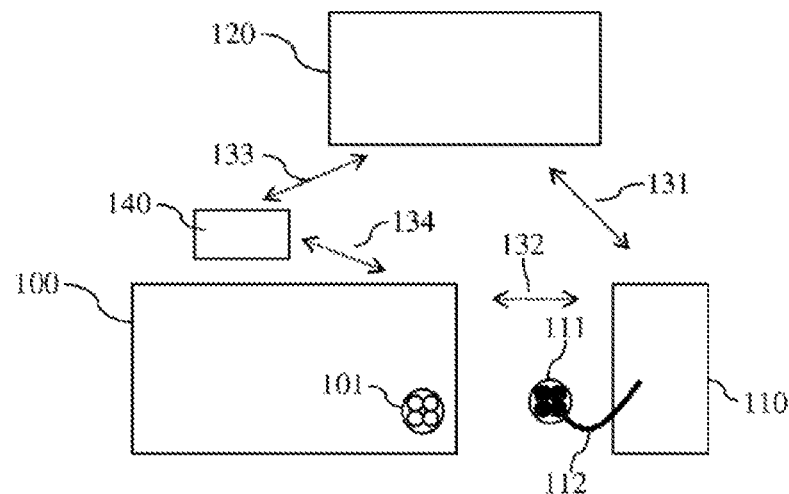
FIG. 1 shows an exemplary charging system for a vehicle.

FIG. 1 shows a block diagram of an exemplary charging system having a charging station 110 and a vehicle 100. The vehicle 100 comprises an electrical store (not depicted) that can be charged with electrical energy from the charging station 110. The vehicle 100 comprises a charging socket 101 at which an appropriate connector 111 on a charging cable 112 can be plugged in. The charging socket 101 and the connector 111 form a plug-in system. The charging cable 112 can be permanently connected to the charging station 110 (as depicted). On the other hand, the charging cable 112 can be connected to the charging station 110 by means of a plug-in connection (e.g., in the case of AC charging).

As depicted in FIG. 1, the charging socket 101 is fitted to the vehicle 100. The charging connector 111 (coupler) is, in particular in the case of DC charging, permanently connected to the charging station 110 by means of the charging cable 112. Different connector variants exist according to the connector standard IEC 62196-3: Combo 1, Combo 2, DC Type 1, DC Type 2. Both Combo 1 and Combo 2 are connected to the vehicle using the same plug-in architecture. In the case of DC Type 1 and DC Type 2, some of the same pins (i.e., the same electrical contact parts) of the plug-in system are used for AC and DC charging. In particular, in the case of DC Type 2 plug-in systems, the contact parts for L2/DC− and L3/DC+ are jointly used for AC charging and DC charging.

A charging control unit of the vehicle 100 can be configured to communicate with a charging station 110 according to a communication protocol by means of a charging-station/vehicle communication connection 132. In particular, a pilot line of the charging cable 112 can be used as a communication connection 132 to exchange a pilot signal between vehicle 100 and charging station 110. In this case, the pilot line in the charging cable 112 can be used to allow a pilot circuit that is used for exchanging the pilot signal between a control unit of the charging station 110 and the charging control unit of the vehicle 100. The charging control unit of the vehicle 100 can be configured to set a predefined level of the pilot signal in order to communicate a charging-related state of the vehicle 100. The control unit of the charging station 110 can be configured to use pulse width modulation (e.g., between 7% and 97% duty cycle) of the pilot signal to communicate to the vehicle 100 what current level or charging power can be provided by the charging station 110 as a maximum. The pilot signal can in this case oscillate between two predefined levels at a predefined frequency (e.g., 1 kHz).

An example of such a level- and/or PWM-based communication protocol is the IEC 61851-1 standard. This standard defined different modes, with in particular Mode 3 and Mode 4 being relevant in connection with charging at a charging station 110. In particular, Mode 3 is relevant for AC charging and Mode 4 is relevant for DC charging at a charging station 110. The communication protocol according to the IEC 61851-1 standard is largely restricted to transfer of the status of the vehicle 100 (is there or is there not a charging connection to the charging station 110, or is charging taking place or not) and to transfer of the maximum charging power (by means of PWM).

The unidirectional charging communication according to the IEC 61851-1 standard cannot communicate vehicle data to the charging station 110. In particular, the IEC 61851-1 standard does not allow the transmission of identification data from the vehicle 100 to the charging station 110 (or vice versa). Therefore, the charging communication according to the IEC 61851-1 standard does not allow direct association between an identifier of the vehicle 100 and an identifier of the charging station 110. In other words, the charging communication according to the IEC 61851-1 standard does not allow direct determination of the charging partners in a charging process.

FIG. 1 shows a system 120 configured to use a charging station communication connection 131 to communicate with the charging station 110. Furthermore, the system 120 is configured to use a device communication connection 133 to communicate with a communication device 140 of a user of the vehicle 100. In particular, the system 120 (which comprises e.g., a central server) can communicate with a multiplicity of charging stations 110 and with a multiplicity of communication devices 104.

The charging station communication connection 131 can be used to send, for example, charging station data from a charging station 110 to the system 120. The charging station data can indicate an identifier of the charging station 110 and a property and/or a state of the charging station 110, such as, for example:
- a position of the charging station 110 (e.g., an address and/or GPS coordinates);
- available charging powers and/or charging voltages of the charging station 110;
- available charging modes (e.g., AC charging, DC charging, conductive charging via a charging cable, inductive charging, etc.) of the charging station 110;
- available charging connectors of the charging station 110; and/or
- an operating status of the charging station 110 (e.g., charging station 110 is available for charging process, charging station 110 is in use by an ongoing charging process, charging station 110 charges a vehicle 100 with a particular charging power, charging station 110 is faulty, etc.).

The device communication connection 133 can be used to send vehicle data from a vehicle 100 to the system 120. The vehicle data can be transmitted from the vehicle 100 to the communication device 140 by means of a radio connection 134 between the communication device 140 and the vehicle 100. The radio connection 134 can comprise a short-range radio connection, in particular a Bluetooth connection. The vehicle data can indicate an identifier of the vehicle 100 and also information regarding a state of charge of the vehicle 100 and/or regarding a charging process at a charging station 110, for example:
- a position (e.g., an address and/or GPS coordinates) at which a charging process is effected;
- a charging power and/or a charging voltage with which a charging process is effected;
- a charging mode (e.g., AC charging, DC charging, conductive charging via a charging cable, inductive charging, etc.) with which a charging process is effected;
- a charging connector by means of which the charging process is effected;
- the amount of energy required for the charging process;
- a predicted charging period for the charging process; and/or
- a time at which a charging process was begun.

The system 120 can be configured to generate a stimulus for a charging process. In particular, the system 120 can be configured to prompt a charging station 110 to reduce or increase a maximum available charging power (if need be temporarily). The charging station 110 will then use the charging-station/vehicle communication connection 132 to inform a vehicle 100 connected to the charging station 110 that the maximum charging power has been reduced. The vehicle 100 will then reduce the charging power drawn by the charging station 110. Furthermore, the vehicle 100 will send vehicle data to the system 120 by means of the radio connection 134 and by means of the device communication connection 133 indicating that the charging power has been reduced. By way of example, the predicted charging period can be increased/decreased in reaction to the reduction of the maximum charging power.

The system 120 can therefore detect which vehicle 100 shows a reaction to the original stimulus. Since the system 120 knows the identifier of the charging station 110 that has caused the stimulus, and since the system 120 knows the identifier of the vehicle 100 that has reacted to the stimulus, the system 120 can make an explicit association between vehicle 100 and charging station 110 in order to determine a charging pair.

The explicit association can therefore be ensured in particular by virtue of a specific charging station 110 being actuated such that the charging station 110 brings about an expected and registerable or receivable reaction in the vehicle 100 connected to the charging station 110. The actuation of the charging station 110 and the stimulus caused by the charging station 110 are in this case of a nature such that the reaction of the vehicle 100 ensures an explicit association between vehicle 100 and charging station 110.

Alternatively or additionally, a specific vehicle 100 can be actuated such that the vehicle 100 brings about an expected and registerable or receivable reaction in the charging station 110 to which the vehicle 100 is connected. By way of example, the vehicle 100 can be prompted to interrupt or start a charging process (temporarily). This leads to a change in the operating state in the charging station 110, which can be communicated to the system 120 by means of the charging station data. The actuation and the stimulus of the vehicle 100 are therefore of a nature such that the reaction of the charging station 110 ensures an explicit association between charging station 110 and vehicle 100.

The reaction of one of the charging partners (i.e., vehicle 100 or charging station 110) to a stimulus of the respective other charging partner is therefore used for explicitly associating the charging partners with one another. In particular, it is thus possible for pairs of identifiers of the charging partners to be determined.

It is therefore possible to ascertain a charging pair with a respective charging partner from two different sets of possible charging partners. The two different sets comprise a set of possible charging stations 110 and a set of possible vehicles 100. The charging pair comprises a charging station 110 and a vehicle 100 for performing a charging process at the charging station 110.

It is possible for a stimulus for the charging process by a stimulating charging partner from a first set of the two sets of possible charging partners (e.g., by a vehicle 100) to be prompted. Furthermore, a reaction to the stimulus by a reacting charging partner from a second set of the two sets of possible charging partners (e.g., by a charging station 110) can be detected. It is then possible for a charging pair to be formed that comprises the stimulating charging partner and the reacting charging partner.

Figure 2:
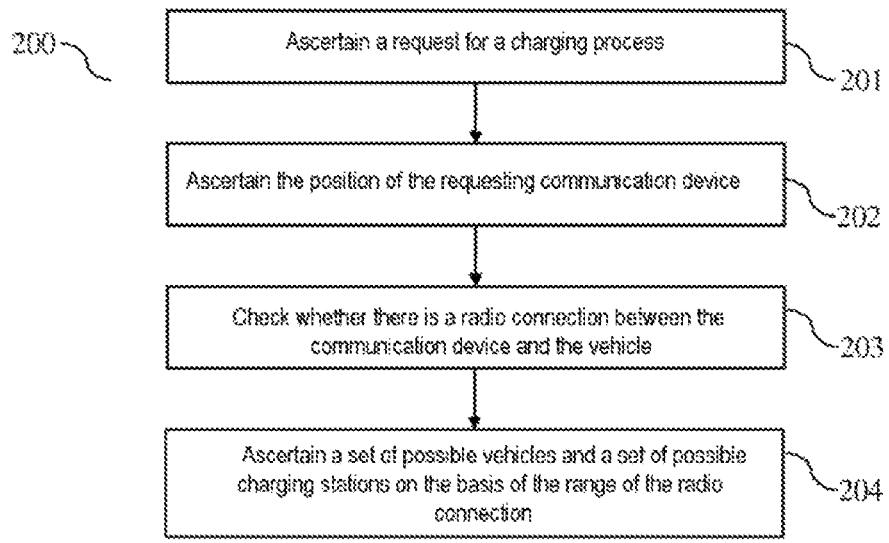
FIG. 2 shows a flowchart for an exemplary method for performing a charging process for a vehicle at a charging station.

The sets of possible charging partners can be relatively large. By taking into consideration one or more narrowing-down conditions, the sets can be reduced. FIG. 2 shows a method 200 that can be used to reduce in particular the set of possible charging stations 110. In particular, FIG. 2 shows a flowchart for an exemplary method 200 for performing a charging process for a vehicle 100 at a charging station 110. The method 200 comprises detecting 201 a request for a charging process on an electronic communication device 140 (e.g., on a smartphone). In particular, it is possible to detect that a user requests a charging process. Additionally, the method 200 comprises ascertaining 202 position data (e.g., by means of a GPS receiver) indicating a position of the communication device 140. The method 200 further comprises ascertaining 203 whether there is a radio connection 134 between the communication device 140 and the vehicle 100. In this case, the radio connection 134 is based on a short-range communication method with a nominal range. It is then possible for the position data and the nominal range to be taken as a basis for ascertaining a (possibly reduced or limited) set of possible charging stations 110 and/or a set of possible vehicles 100 (step 204).

A Bluetooth radio connection between a vehicle 100 and a communication device 140 and/or a charging station 110 can therefore be used to ascertain limited sets of possible vehicles 100 and of possible charging stations 110.

A personal electronic device 140 (e.g., a smartphone) with for example an app can enable charging at a charging station 110 if need be only when there is also a radio connection 134 to the vehicle 100. Additionally, the app can send certain information to the charging station 110 when there is a radio connection 134 if need be. An example of such information is an identifier for the vehicle 100, such as for example the VIN or an MAC address of the Bluetooth device in the vehicle 100. A server-end check would thus also be possible by virtue of the vehicle identifier being checked against the identifier stored in the server 120 for the Bluetooth device.

Alternatively or additionally, a personal electronic device 140 (e.g., a smartphone) can notify the charging station 110 of whether there is the radio connection 134 to the vehicle 100. If there is such a connection, the radius of possible charging stations 110 can be limited to the (nominal) range of the radio connection 134 (for example to approximately 10 meters in the case of Bluetooth).

The method 200 therefore allows efficient and precise association of charging stations 110 and vehicles 100 even when the IEC 61851-1 standard is used. In particular, by taking into consideration a short-range radio connection 134, the sets of possible charging stations 110 and vehicles 100 for determining a charging pair can be substantially reduced. The ascertained charging pairs can be used in a pool in order to provide control power for an electrical supply system. Alternatively or additionally, the association can be used to check an authorization to perform a charging process.

The present invention is not limited to the exemplary embodiments shown. In particular, it should be borne in mind that the description and the Figures are intended to illustrate only the principle of the proposed methods, apparatuses and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for performing a charging process for a vehicle at a charging station, comprising the acts of:
    detecting a request for a charging process from an electronic communication device at a server that manages a plurality of charging stations;
    ascertaining position data indicating a position of the electronic communication device;
    ascertaining whether there is a radio connection between the electronic communication device and the vehicle, wherein the radio connection is based on a short-range communication method with a nominal range; and
    ascertaining a set of possible charging stations and a set of possible vehicles by the server on a basis of the position data and the nominal range.

2. The method as claimed in claim 1, wherein the set of possible charging stations comprises one or more charging stations and the set of possible vehicles comprises one or more vehicles that are within a radius of the position of the electronic communication device that corresponds to the nominal range.

3. The method as claimed in claim 1 further comprising the act of preventing a charging process if it is ascertained that there is no radio connection between the electronic communication device and the vehicle.

4. The method as claimed in claim 2 further comprising the act of preventing a charging process if it is ascertained that there is no radio connection between the electronic communication device and the vehicle.

5. The method as claimed in claim 1 further comprising the acts of:
    ascertaining a vehicle identifier of the vehicle;
    ascertaining a communication identifier of a communication unit of the vehicle for the radio connection; and
    preventing or permitting the charging process on a basis of the vehicle identifier and the communication identifier.

6. The method as claimed in claim 2 further comprising the acts of:
    ascertaining a vehicle identifier of the vehicle;
    ascertaining a communication identifier of a communication unit of the vehicle for the radio connection; and
    preventing or permitting the charging process on a basis of the vehicle identifier and the communication identifier.

7. The method as claimed in claim 3 further comprising the acts of:
    ascertaining a vehicle identifier of the vehicle;
    ascertaining a communication identifier of a communication unit of the vehicle for the radio connection; and
    preventing or permitting the charging process on a basis of the vehicle identifier and the communication identifier.

8. The method as claimed in claim 1 further comprising the acts of:
    ascertaining a charging pair from two different sets of possible charging partners, wherein the two different sets of possible charging partners comprise the set of possible charging stations and the set of possible vehicles, wherein the charging pair comprises a charging station from the set of possible charging stations and a vehicle from the set of possible vehicles, wherein the ascertaining of the charging pair comprises:
        prompting a stimulus for the charging process by a stimulating charging partner from a first set of the two different sets of possible charging partners;
        detecting a reaction to the stimulus by a reacting charging partner from a second set of the two different sets of possible charging partners; and forming the charging pair comprising the stimulating charging partner and the reacting charging partner.

9. The method as claimed in claim 8, wherein:
the charging pair is interconnected via a charging-station/vehicle communication connection; and
the stimulus is transmitted from the stimulating charging partner to the reacting charging partner via the charging-station/vehicle communication connection.

10. The method as claimed in claim 9, wherein the charging-station/vehicle communication connection does not allow an identifier of one of the charging partners of the charging pair to be transmitted to the other charging partner of the charging pair.

11. The method as claimed in claim 9, wherein the charging-station/vehicle communication connection allows the charging station of the charging pair to transmit to the vehicle of the charging pair information regarding a maximal charging power that can be provided by the charging station.

12. The method as claimed in claim 9, wherein the charging-station/vehicle communication connection allows the vehicle of the charging pair to transmit to the charging station of the charging pair information about whether or not charging power can be drawn.

13. The method as claimed in claim 9, wherein the charging-station/vehicle communication connection allows a communication between the charging pair according to an IEC 61851-1 standard or according to another communication standard.

14. The method as claimed in claim 8, wherein:
the stimulating charging partner is the charging station;
the reacting charging partner is the vehicle;
the stimulus comprises a change in the maximum charging power provided by the charging station for the charging process; and
the reaction comprises a change in a charging time ascertained by the vehicle for the charging process.

15. The method as claimed in claim 8, wherein:
the stimulating charging partner is the vehicle;
the reacting charging partner is the charging station;
the stimulus comprises a change in a charging power drawn by the vehicle for the charging process; and
the reaction comprises a change in an operating status of the charging station for the charging process.

16. The method as claimed in claim 8, wherein the act of detecting the reaction to the stimulus comprises:
ascertaining a period since the stimulus was prompted; and
detecting the reaction to the stimulus after a period shorter than, or a same as, a predefined maximum period.

* * * * *